J. C. FOWLER.
Running-Gear for Wagons.
No. 217,601. Patented July 15, 1879.
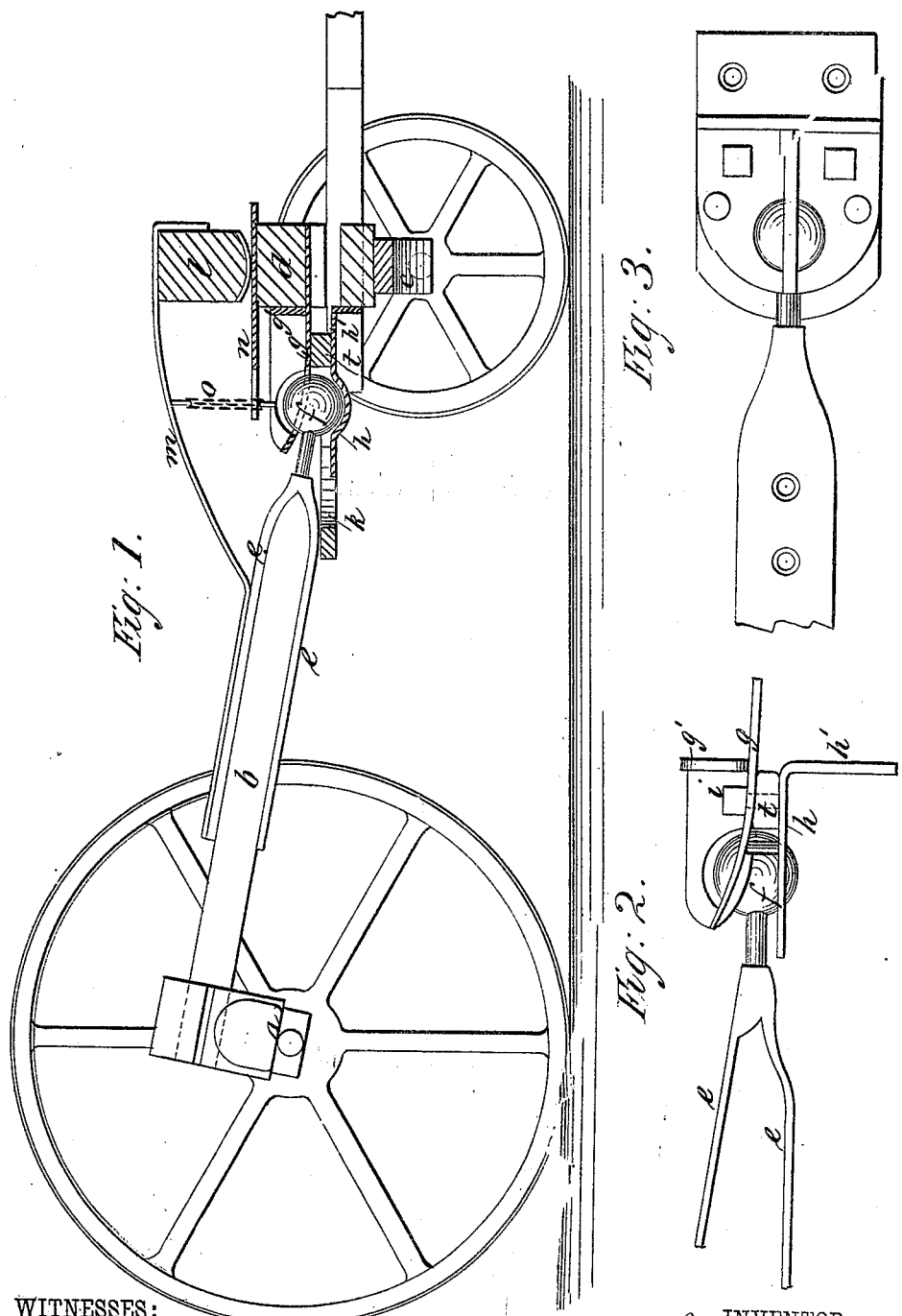

UNITED STATES PATENT OFFICE.

JOSEPH C. FOWLER, OF ARCOLA, TEXAS, ASSIGNOR TO HIMSELF AND JNO. H. B. HOUSE, OF SAME PLACE.

IMPROVEMENT IN RUNNING-GEARS FOR WAGONS.

Specification forming part of Letters Patent No. 217,601, dated July 15, 1879; application filed May 6, 1879.

*To all whom it may concern:*

Be it known that I, JOSEPH C. FOWLER, of Arcola, in the county of Fort Bend and State of Texas, have invented a new and Improved Coupling and Fifth-Wheel for Vehicles, of which the following is a specification.

My invention relates to improved means for connecting the front axle and reach of a wagon or other vehicle.

I make use of a ball-and-socket coupling device applied back of the front axle, whereby the forward axle is not weakened by boring to insert a king-bolt, and the vehicle may be turned shorter and with less strain than when the joint is in line with the axle.

I will describe the construction and operation, in connection with the accompanying drawings, wherein—

Figure 1 is a vertical longitudinal section of the running-gear of a wagon fitted with my improved coupling devices. Fig. 2 is a side view of the ball-and-socket coupling separately. Fig. 3 is a top view of the same.

Similar letters of reference indicate corresponding parts.

$a$ is the rear axle, $b$ the reach, $c$ the forward axle, and $d$ the head-block, of a cane-wagon intended for use on plantations; but I do not limit myself to any special vehicle in the application of my invention.

Attached upon the end of reach $b$ by straps $e\ e$ is a ball, $f$. Attached rigidly to head-block $d$ is a metal plate, $g$, that is apertured to set over the ball $f$, and attached to axle $c$ is a plate, $h$, that is apertured or formed with a cup-shaped recess that sets up against the under side of ball $f$.

The plate $g$ is attached to head-block $d$ by screws passing through the plate and its flange $g'$, and plate $h$ is attached to the axle by screws passing through its flange $h'$.

I prefer to connect these plates $g$ and $h$ rigidly together by lag-screws or bolts $i$, (shown in Fig. 2,) with an intervening metal strip, $t$, to retain them at the proper distance apart.

A semicircular plate, $k$, is attached at its ends to the axle $c$, and extends beneath the reach $b$, to form a bearing for the reach in whatever position the axle may be turned.

Upon the head-block $d$ is a cross-bar, $l$, that is connected, by a brace, $m$, with the reach. The bar $l$ rests loosely on the curved plate $n$, that is attached upon $d$.

The weight of the reach is sustained principally by bar $l$ and brace $m$, and there may be a chain, $o$, extending from brace $m$ downwardly to the ball $f$ to equalize the weight.

It will be seen that the ball $f$ is the center on which the forward axle swings in turning the wagon, and as this center is back of the axle the forward wheels can be turned short with the axle at right angles to its former position without the wheels coming in contact with the reach, thereby permitting the wagon to be turned within a limited area.

The construction described has also the further advantage that it is not necessary to weaken the axle by boring for the insertion of a king-bolt, as is usually done.

The wagon can be readily uncoupled by removing the bolts that connect the plates $g\ h$.

The described coupling devices are applicable to any style of running-gear or vehicle.

Having thus described my invention, I claim as new and desire to secure by Letters Patent—

1. The combination, with an axle and reach, of the ball $f$ and socket-plates $g\ h$, substantially as and for the purposes set forth.

2. In combination with the axle and reach, the ball $f$, socket-plates $g\ h$, head-block $d$, cross-bar $l$, and brace $m$, substantially as described and shown, and for the purposes specified.

3. The semicircular plate $k$, in combination with the reach $b$, axle $c$, and ball-and-socket coupling device, substantially as and for the purposes set forth.

JOSEPH C. FOWLER.

Witnesses:
JOE C. ABY,
G. K. CESSNA.